Figure 1:
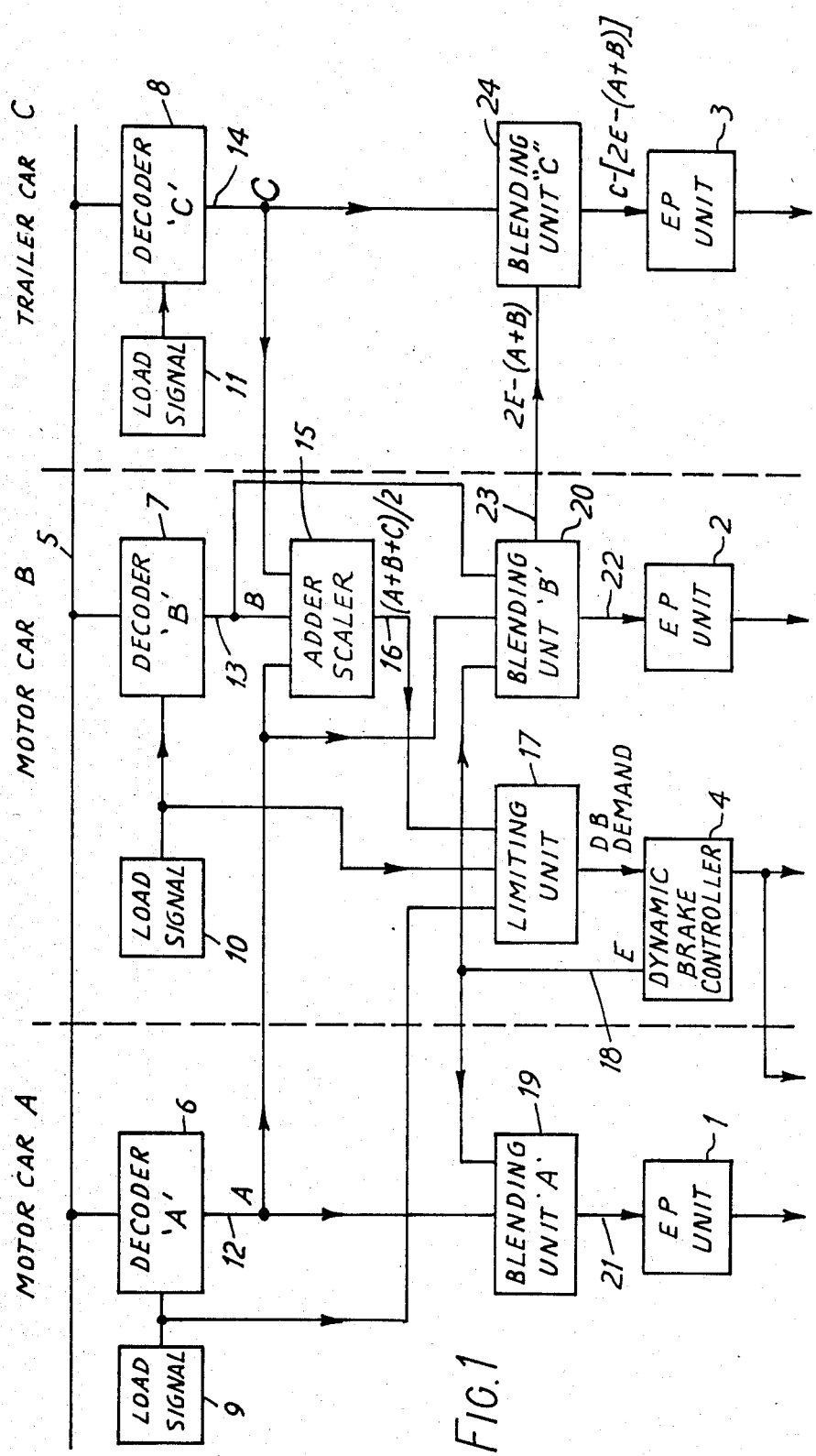

United States Patent [19]

Poole

[11] Patent Number: 4,692,867
[45] Date of Patent: Sep. 8, 1987

[54] BRAKE CONTROL SYSTEM

[75] Inventor: John D. Poole, Devizes, England

[73] Assignee: Westinghouse Brake and Signal Co., Ltd., Wiltshire, England

[21] Appl. No.: 696,583

[22] Filed: Jan. 31, 1985

[30] Foreign Application Priority Data

Feb. 13, 1984 [GB] United Kingdom ............. 8403721

[51] Int. Cl.$^4$ .................................................. B60T 8/04
[52] U.S. Cl. ............................................ 364/426; 303/3; 246/187 R
[58] Field of Search ................. 364/426, 424; 303/3; 188/156, 159; 246/182 B, 182 R, 182 A, 187

[56] References Cited

U.S. PATENT DOCUMENTS

| | | | |
|---|---|---|---|
| 3,887,239 | 6/1975 | Engle | 303/3 |
| 3,944,287 | 3/1976 | Nagase | 303/3 |
| 4,199,195 | 4/1980 | Pekarcik et al. | 303/3 |
| 4,550,372 | 10/1985 | Kahrs | 364/426 |
| 4,582,280 | 4/1986 | Nichols | 246/187 |

Primary Examiner—Parshotam S. Lall
Attorney, Agent, or Firm—Larson and Taylor

[57] ABSTRACT

A brake control system for a multiple unit train of mixed motor cars and trailer cars—of the type usually to be found operating as metro or mass transit trains——and in which the motor cars have dynamic brakes operation of which is blended with, but given preference over, the friction brakes of all units. A brake demand signal calling for a given level of train retardation is weighted on each vehicle, according to the load of the vehicle, and the level of dynamic braking effort invoked on each motor car is limited in accordance with a maximum adhesion level calculated n proportion to the measured load of that car. In a modified arrangement the adhesion level is calculated in accordance with the load of the lightest loaded motor car. Signals representing the amount of dynamic brake effort achieved by each motor car is supplied to a trailer car and subtracted from the load weighted braking effort for the trailer car and the result used to actuate the friction brakes of the trailer.

11 Claims, 12 Drawing Figures

COMPARISON OF METHODS OF MAXIMISING
USE OF DYNAMIC BRAKE IN A THREE CAR SET

DEMAND 1·0 m/s²
ADHESION LIMIT 1·35 m/s²
DYNAMIC BRAKE LIMIT PER CAR  81 KN
CAR TARE WEIGHT 40 Te

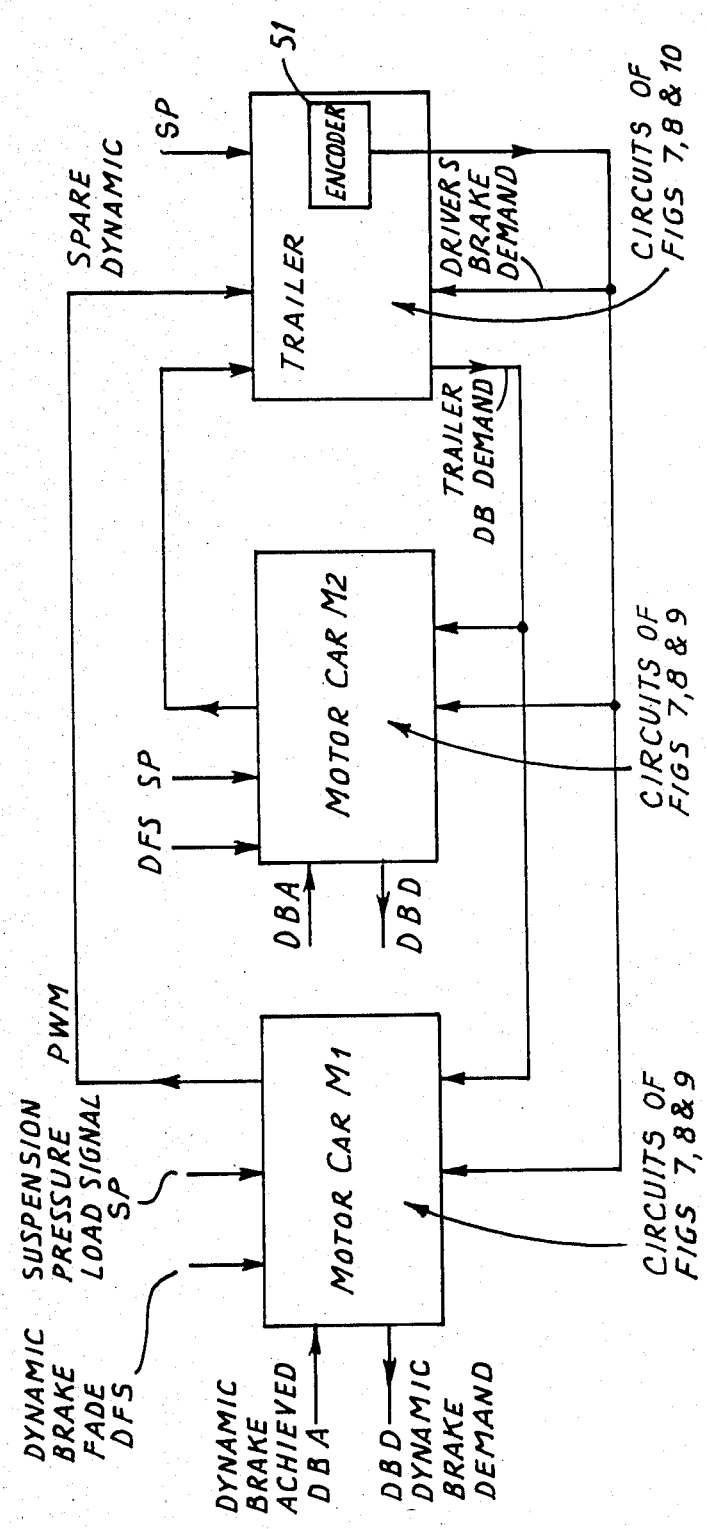

TRANSDUCER CIRCUIT
ALL CARS

BRAKE CONTROL SYSTEM

The invention relates to a brake control system for a multiple unit vehicle, especially a railway train, comprising a mixture of motor and trailer units and which has a mixed braking system of dynamic and friction brakes.

Dynamic braking systems have been known for some time and offer the advantages of saving wear of friction brake components and also, if the dynamic brake is of the regenerative type, of recovering some of the kinetic energy of the vehicle. However, the efficiency of a dynamic brake is directly related to the velocity of the vehicle and as the speed of the vehicle decreases the dynamic brake has to be supplemented by a friction brake.

Thus virtually any vehicle provided with a dynamic brake must have a mixed braking system including friction brakes and it is therefore well known in the art to employ systems of co-ordinating or blending the operation of the dynamic and friction brakes with the object of maintaining a selected level of retardation throughout a decreasing speed range. In order to make the best use of the dynamic brake such prior art mixed braking systems usually preferentially select the dynamic brake and use a feed-back connection from the dynamic brake indicating the level of braking effort achieved and this is used to "back-off" the friction brake at speed. In such an arrangement as the dynamic braking effort falls with reducing speed the friction brake is brought into operation gradually in order to maintain the selected retardation rate.

A problem can arise with existing mixed braking systems when a high rate of retardation is selected because this may be greater than that which can be supported by the adhesion of the dynamically braked wheels. For example, in a multiple unit railway vehicle which comprises motor and trailer cars the dynamic brakes are provided only on the motor cars. Since the wheel to rail adhesion is determined by the load carried by the car but the load is shared between all cars (possibly unevenly) then the load on the dynamically braked wheels may be insufficient to provide adhesion capable of sustaining the required retardation rate. A second problem can arise, especially in the case of railway vehicles, because a railway train of such mixed multiple units is designed to be made up in a fixed order and the equipment of the braking system may not be identical on all motored cars. For example the dynamic brake controller, which preferentially selects the dynamic brake may be located on only one motor car. In this case if either of the motor cars is faulty it is has to be replaced by another motor car of identical type.

The invention has for its object to provide a brake control system capable of predicting the maximum adhesion level of a dynamically braked unit and ensuring that the dynamic effort does not exceed the sustainable level, and in one form of the invention, to provide a brake control system for a multiple unit train in which those parts on motor cars are identical.

According to the invention there is provided a brake control system for a multiple unit train, of motor and trailer units, which has a mixed braking system of dynamic and friction brakes in which the dynamic brakes are applied preferentially comprising means for generating a brake demand signal calling for a rate of retardation of the train, load responsive means on each unit operative to provide for a unit a load weighed brake signal corresponding the brake demand signal and in accordance with the load of the unit, summing means having inputs connected to receive the load weighed brake signals from all units and an output connected to control actuation of the dynamic brake system, friction brake controlling means on each unit connected to control the level of friction braking of a respective unit in response to the difference between the load weighed brake signal for the unit and a further signal which, on a dynamically braked unit, represents the dynamic braking effort achieved or, on a trailer unit, the excess of dynamic brake effort achieved over that required by the load weighed signals of the dynamically braked units, and dynamic brake control signal limiting means operative to effectively limit dynamic braking to a calculated maximum adhesion limit.

Figure 2:
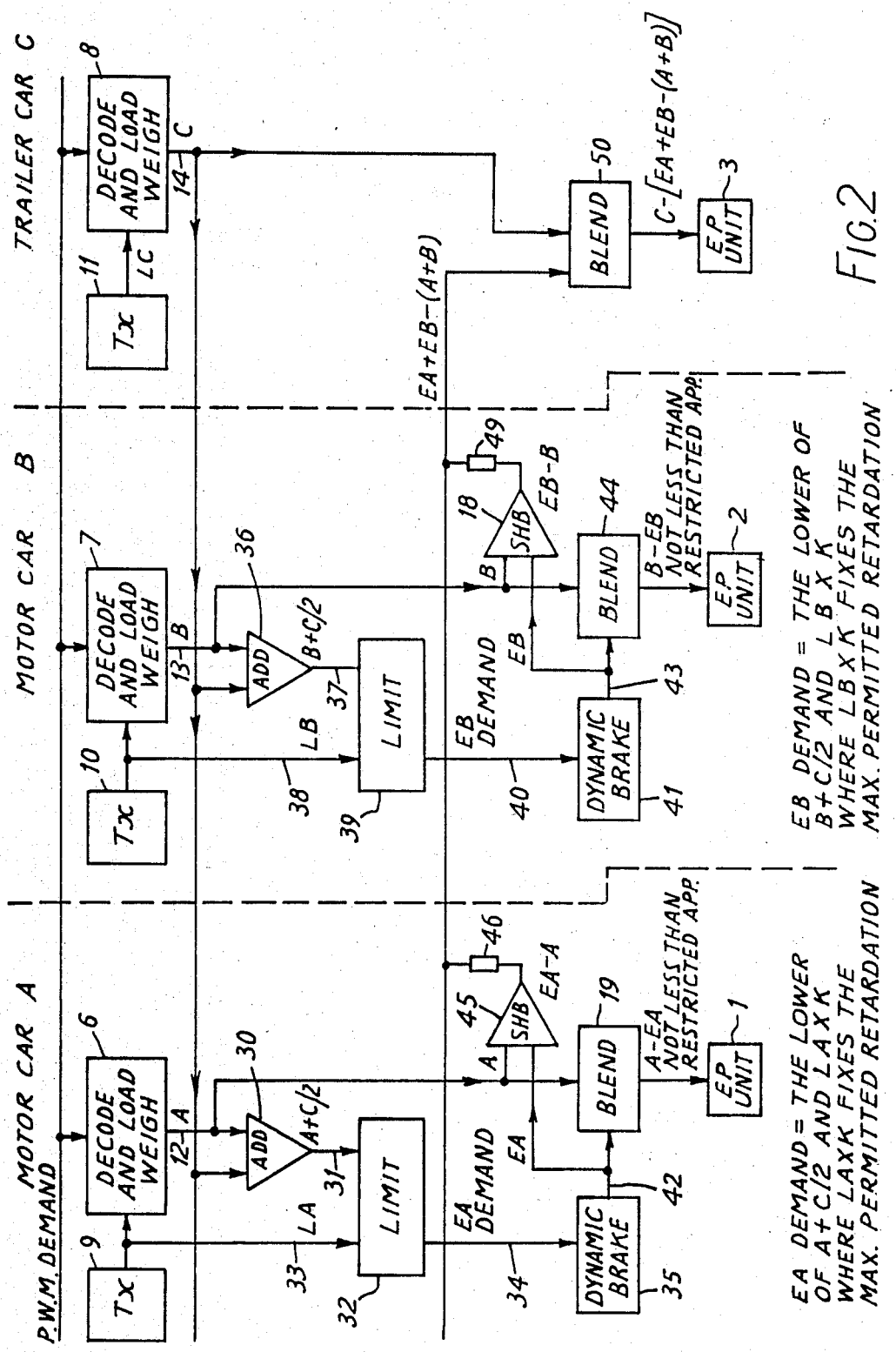
Figure 3A:
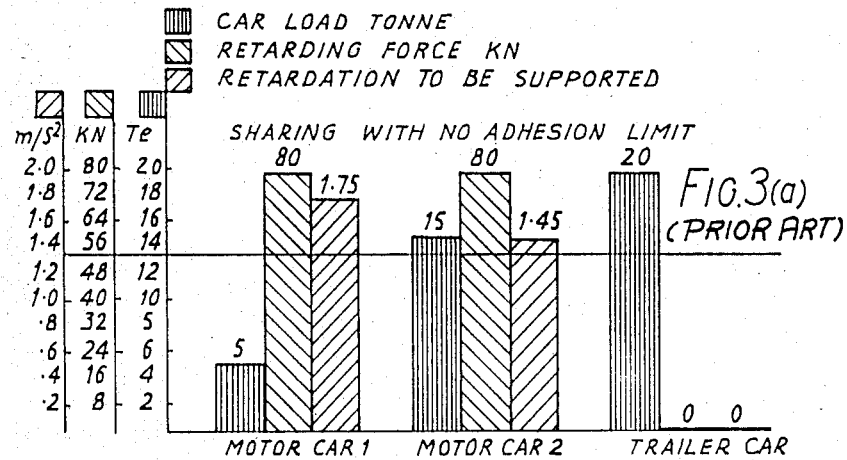
Figure 5:
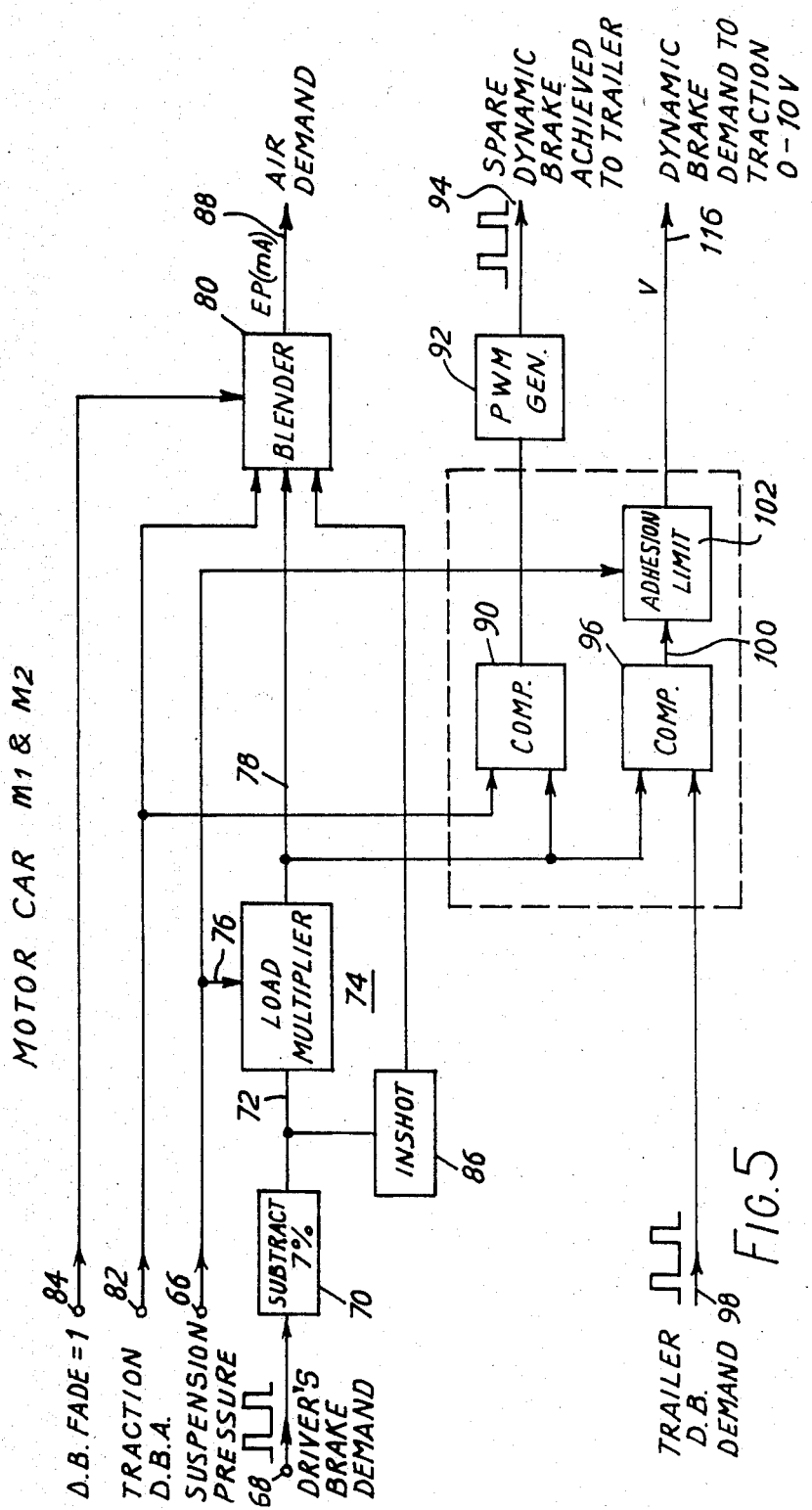
Figure 6:
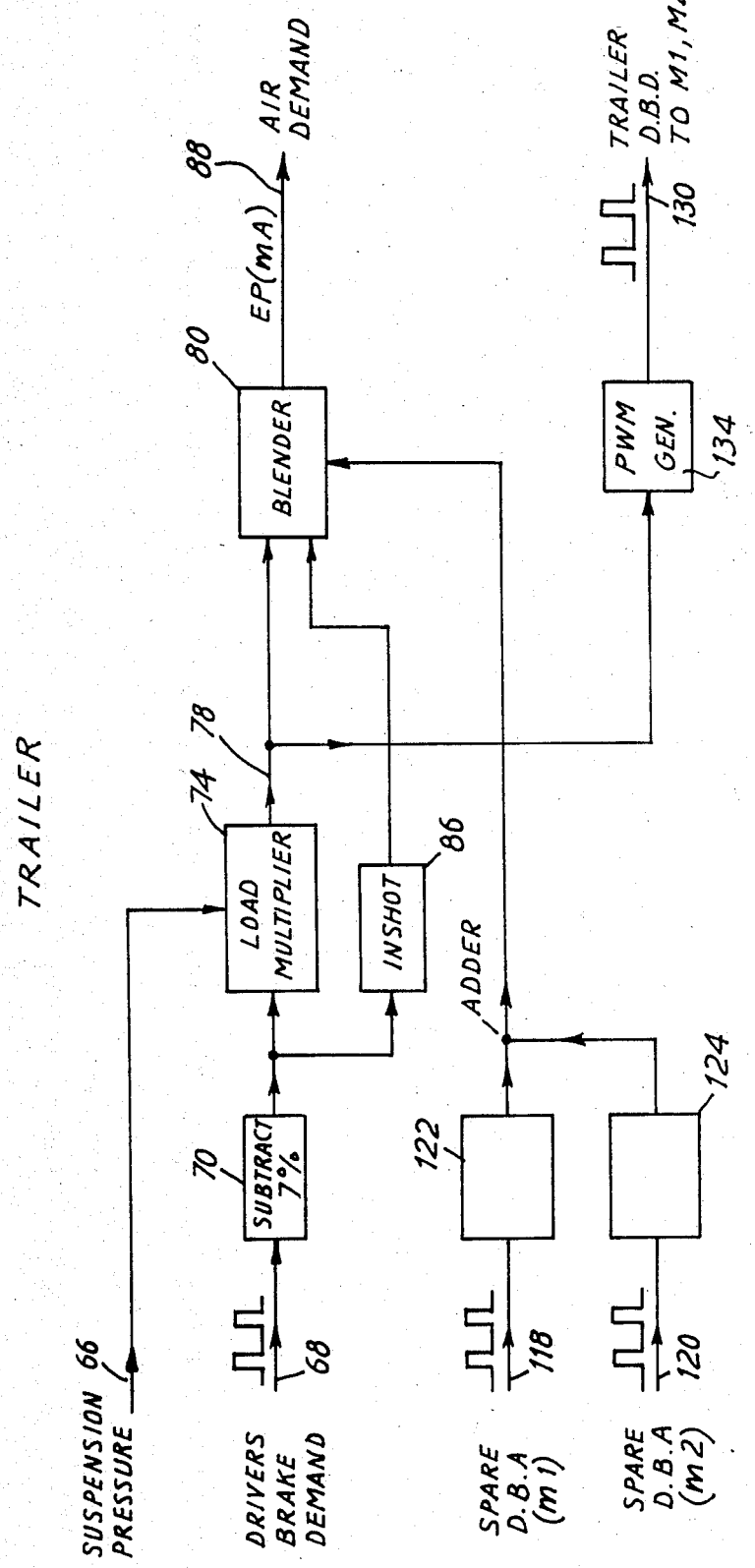

The invention and how it may be carried into practice will now be described with reference to the accompanying drawings, in which:

Fig 1 shows a schematic block diagram of a mixed braking system of a multiple unit railway train, FIG. 2 shows a modified form of the brake system of FIG. 1 in which those parts of the control system on motor cars are identical, FIGS. 3(a),(b) and (c) show histograms for comparison of the performance of a prior art control system, the system of FIG. 1 and the system of FIG. 2 respectively, FIG. 4 shows a block diagram of the electronic brake control system of a three car train, comprising two motor cars and one trailer car, FIG. 5 shows a block diagram of the electronics for each of the motor cars of the system of FIG. 4, FIG. 6 shows a block diagram of the electronics of the trailer car of the system of FIG. 4, and FIGS. 7, 8, 9 and 10 show detailed circuit diagrams for the electronics of the blocks of FIGS. 5 and 6.

Referring now to FIG. 1 there is shown a schematic representation of a three unit train comprising motor cars A and B and a trailer car C. Each of the car units has a friction brake system controlled by electropneumatic units 1, 2 and 3 respectively, and car units A and B are also provided with dynamic brakes both of which are controlled by a dynamic brake controller 4.

The brake control system for the whole train is operated by means of a signal carried by a brake demand signal line 5 running the whole length of the train, which is generated by a handle operated unit (not shown) located in the driver's cab. A level of retardation and the corresponding brake demand signal is generated in accordance with the position of the driver's brake control handle. The brake demand signal is decoded on each of the cars A, B and C by decoder units 6, 7 and 8 respectively and the outputs from these decoders control operation of both the friction and dynamic brakes.

Each car unit A, B and C is also provided with a load sensor 9, 10 and 11 respectively the output of which is connected to the decoders 6, 7 and 8 to modify the brake demand signal to produce in respect of each of the car units a brake control signal on line 12, 13 and 14 which is directly representative of the amount of braking effort required for that car unit.

The preferential application of the dynamic brake is controlled by an adder-scaler unit 15 which receives each of the signals 12, 13 and 14 from the individual car unit's decoders 6, 7 and 8 and generates a signal on line 16 which is supplied to the dynamic brake controller 4 to provide as much dynamic braking as possible. The output of the adder-scaler 15 is connected to the dynamic brake controller 4 through a limiting unit 17 which is operative to limit the dynamic braking effort to a maximum adhesion level sustainable by the motor car units A and B. The output of the load sensors 9 and 10 on units A and B is also connected to the limiting unit 17 enabling it to calculate said maximum adhesion level.

For integral control of the friction brakes on the three car units A, B and C there is provided a feed-back connection 18 from the dynamic brake which indicates the average braking effort of the dynamic brakes on cars A and B, this signal is connected to a blending unit 19 on car A and to a further blending unit 20 on car B. The blending unit 19 is operative to subtract the average dynamic brake signal 18 from the load weighed brake demand signal 12 for car unit A thus producing an output 21 which is supplied to actuate the electro-pneumatic friction brake unit 1 on car A. Similarily the dynamic brake signal 18 is subtracted from the load weighed brake demand signal 13 for car B by blending unit 20 which produces a signal 22 connected to control actuation of the electro-pneumatic friction brake unit 2 on unit B. This latter blending unit 20 also receives the load weighed brake demand signal 12 for car A and provides a further output 23 representative of the excess of dynamic brake effort over that required by the brake demand signals for both cars A and B, which is connected to a further blending unit 24 on car unit C. This blending unit 24 also subtracts the "spare" dynamic brake signal from the brake demand signal 14 for car C to produce an output 25 which is connected to control actuation of the electro-pneumatic unit 3 controlling the friction brake on car unit C.

The total dynamic braking effort required is calculated according to the load of all car units, A, B and C, and in some instances, for example, when units A and B are relatively lightly loaded, this can cause wheel slip or skidding because the wheel to rail adhesion limit required to support the dynamic brake effort demanded is insufficient. The limiting unit 17 is operative to calculate the maximum adhesion limit, according to the load weighed signals from sensors 9 and 10, in accordance only with the sensed loads of units A and B. In this described embodiment the brake control equipment fitted to cars A and B is therefore not identical so that if one or other of the car units A and B is temporarily withdrawn from service it has to be replaced by an identical car unit.

In another embodiment of the invention, illustrated in FIG. 2, in which like parts have like references, the brake control equipment on both motor car units A and B is identical so that either can be replaced by a similarily equipped unit as required. In this arrangement the load weighed brake demand output signal 14 from decoder 8 on unit C is supplied to each of the motor units A and B. In unit A the signal 14 is added to the corresponding load weighed brake demand signal 12 from decoder 6 by means of an electronic adder 30, the signal from car C is appropriately scaled, i.e. divided by two so as to share the braking effort required between the dynamically braked cars A and B, and the output of the adder 30 is supplied to a limit unit 32 which also receives from load sensor 9 a further signal 33 representing the load of unit A. The limit unit 32 calculates a maximum adhesion level from signal 33 and, if necessary, limits signal 31 and provides a dynamic brake demand signal 34 which is supplied to the dynamic brake controller 35 for actuation of the dynamic brake.

Similarily, on motor car unit B the signal 14, again scaled by a factor of two, is added to the load weighed brake demand signal 13 for unit B by an adder 36, the output 37 of which is also compared with a calculated adhesion limit based on the load signal 38 from sensor 10 by a limit circuit 39 which generates an output 40 connected to the dynamic brake controller 41 of unit B.

The dynamic brakes of cars A and B provide individual feed-back signals, in car A this signal 42 is connected to the blending unit 19 to call upon an appropriate level of friction braking on car A, as before. In car B the feed-back signal 43 is connected to a blending unit 44, which is identical to unit 19 on car A and this calls upon an appropriate level of friction braking on car B.

In order to enclose operation of the friction brake of trailer car C within the system the dynamic brake feed-back signals 42 and 43 are connected to further electric control circuits as follows; in car A, signal 42 is supplied to the input of a subtraction unit 45 together with the load weighed brake demand signal 12 and the output is connected through a series fixed resistor to a common wire 47. In unit B the signals 43 and 13 are similarily connected to a further subtraction unit 48 the output of which is also connected through a fixed series resistor 49 to the common wire 47. This common wire 47 is connected to a blending unit 50 on trailer car C which includes a common current source connected to the wire 47. Thus, wire 47 carries a total current proportional to the total "spare" dynamic brake effort available on car units A and B, and each of the subtraction units 48 and 49. In the blending unit 50 in car C the total current drain on wire 47 is detected by means of a differential amplifier connected across a fixed resistor and the result is effectively used to "back-off" the friction brake required by the load weighed brake demand signal 14 from decoder 8.

The practical result of the above arrangements are contrasted in FIG. 3 with the results achieved by a prior art system. The results of this known system are illustrated in FIG. 3(a) which shows the weights of the two motor and trailer cars, the retarding force actually produced by the dynamic brakes of the motor cars and the retardation rate required. It should be noted that the preferential selection of dynamic brake with no adhesion limiting has resulted in no braking effort being required of the trailer car.

Figure 3B:
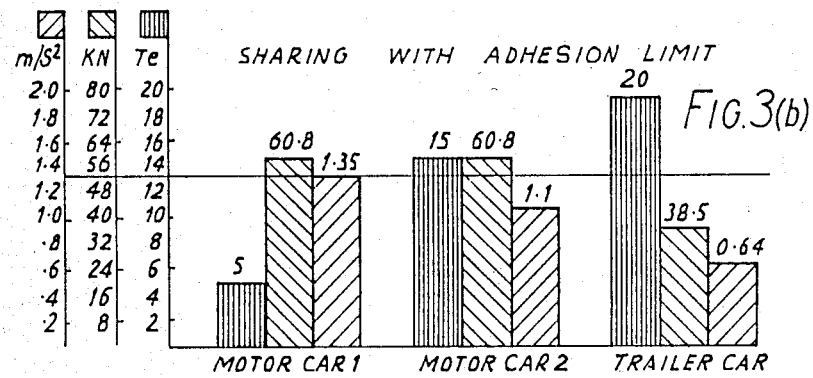

FIG. 3(b) represents operation of a system such as that illustrated in FIG. 1, which includes calculation of an adhesion limit for each of the dynamically braked cars but assumes equal performance for the dynamic brakes on both cars, and it will be seen as a result that some friction braking effort is required of a trailer car.

Figure 3C:
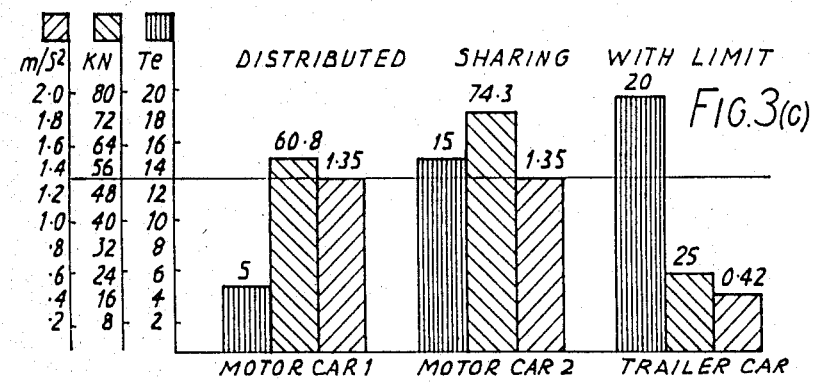

Finally in FIG. 3(c), in which the individual cars have the same weights as in FIGS. 3(a) and (b) and where the dynamically braked cars A and B have separate dynamic brake feed-back connections, it is to be noted that compared with FIG. 3(b) the performance of motor car A is the same but that the remaining braking effort is shared differently between cars B and C with car B taking a greater share of the retarding force up to its adhesion limit, while the contribution of trailer car C is reduced.

FIG. 3(a) clearly shows the over braking on the two motor cars A and B that occurs in prior art systems even before the friction brake on the trailer car is brought into operation. The result of the system of FIG.

1 is prevention of the over braking of the motor cars A and B but at the cost of under utilization of the dynamic brake due to the friction brake on the trailer car C being brought into operation earlier. The system of FIG. 2 is prefered because, as the results in FIG. 3(c) show, the dynamic brake on motor cars A and B is used to optimum and to identical extent.

In alternative arrangements of the system illustrated in FIG. 2 current detection in the blending unit 50 on trailer car C may be achieved by alternative arrangements such as a magnetic amplifier, a coil and Hall-effect device, or an optical coupler. The primary requirement for these arrangements is to provide voltage isolation between the current source and the blending circuit which in the system illustrated in FIG. 2 is achieved by use of a floating power supply for the differential amplifier.

A practical embodiment of the invention will now be descibed with reference to the remaining accompanying drawings. Whilst in these diagrams the electronic circuits are shown complete, many of the components shown serve to bias the active circuits and components, to couple signals between circuits, and others to control the gain of amplifying circuits. The purpose of these components will be immediately apparent, to a skilled electronic engineer, once the functions of the circuits is made clear; thus, the following description will concentrate upon describing the functions of the circuits so as to provide a concise, but meaningful, description.

FIG. 4 shows a block diagram of the electronic brake control system of a three car train comprising two motor cars which have an electric traction motor and a dynamic brake in addition to friction brakes, and one trailer-car which has friction brakes only. The drawing shows the inputs and outputs of each part of the electronic system, the original brake demand signal, calling for a level of retardation, is generated in the block labelled encoder (51) within the trailer-car block, in response to operation by the driver of his brake control means.

The block of electronics on each motor car M1 and M2 receives inputs of: the driver's brake demand signal, a suspension load signal, and a brake demand signal for the trailer car. In addition, each of the blocks receives a feedback signal indicating the amount of dynamic braking achieved and a digital signal, indicating dynamic brake fade. Each block produces a dynamic brake demand output signal and a pulse width modulated signal, connected to the trailer car electronics and which indicates the amount of unused of dynamic braking capacity available. The trailer car's electronics receives inputs of the driver's brake demand, a suspension load signal and, from each motor car, the amount of spare dynamic brake capacity available. The dynamic brake demand for each motor car is limit in accordance with a maximum adhesion limit calculated in accordance with the weight of the motor car.

Figure 7:
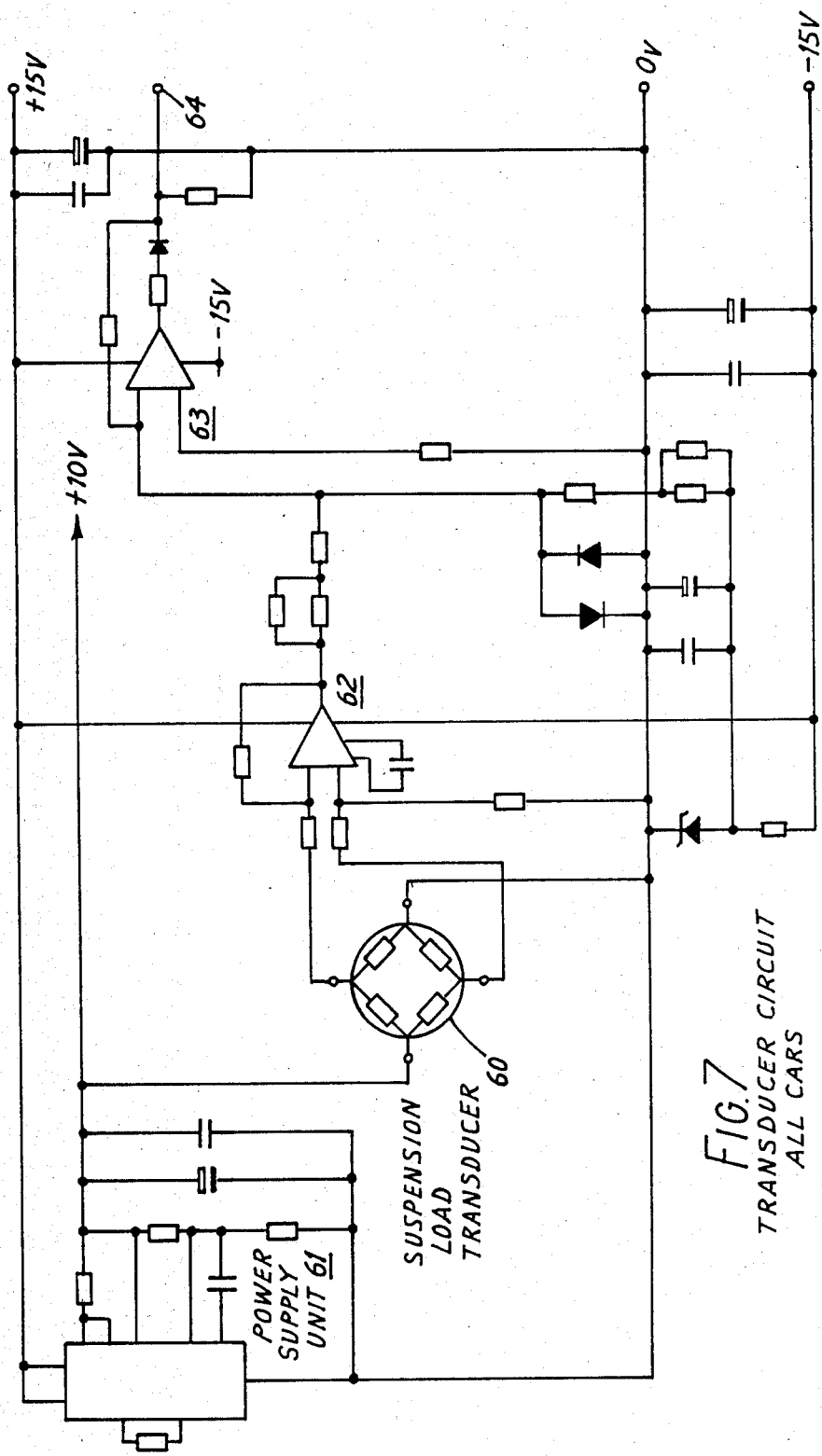
Figure 8:
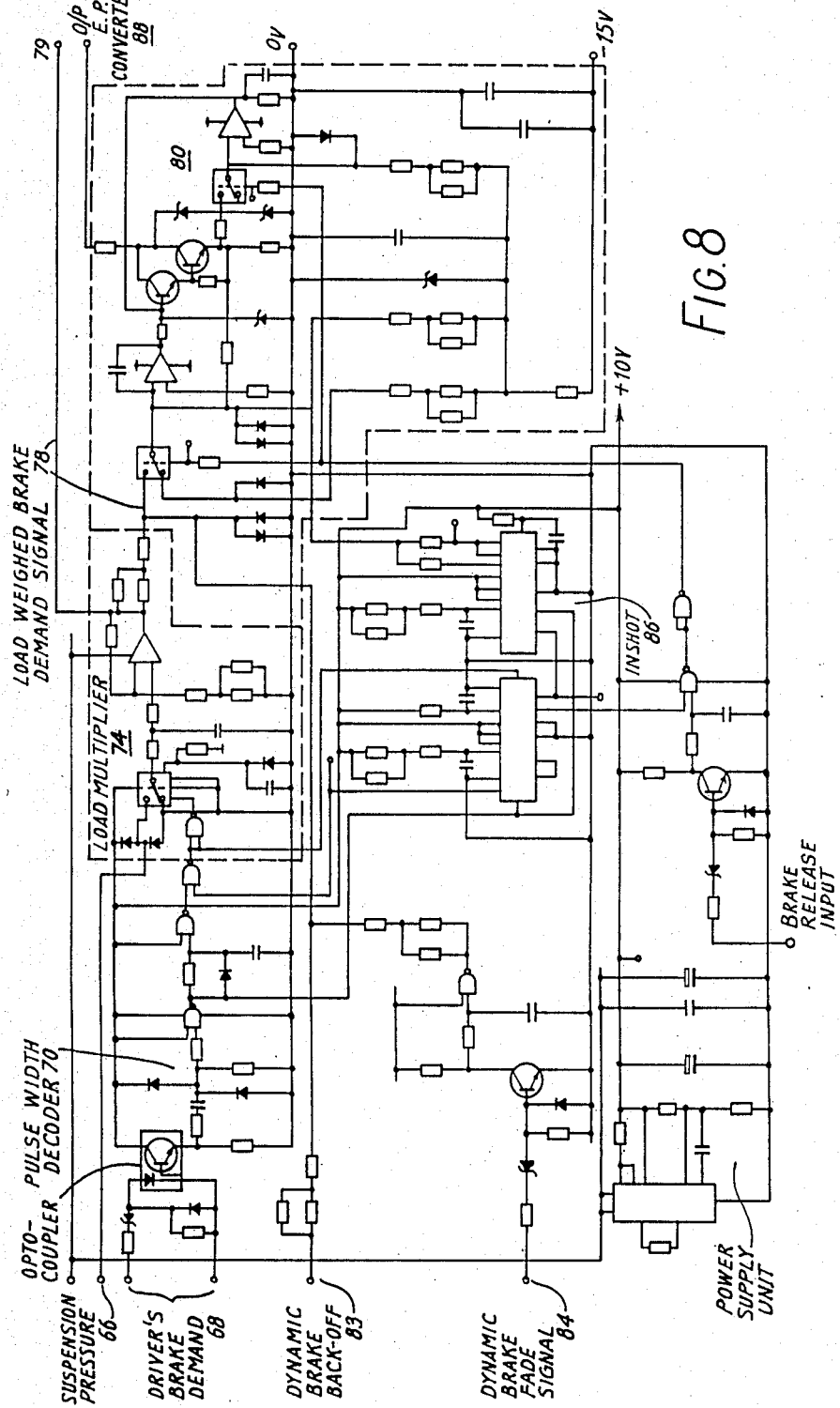
Figure 9:
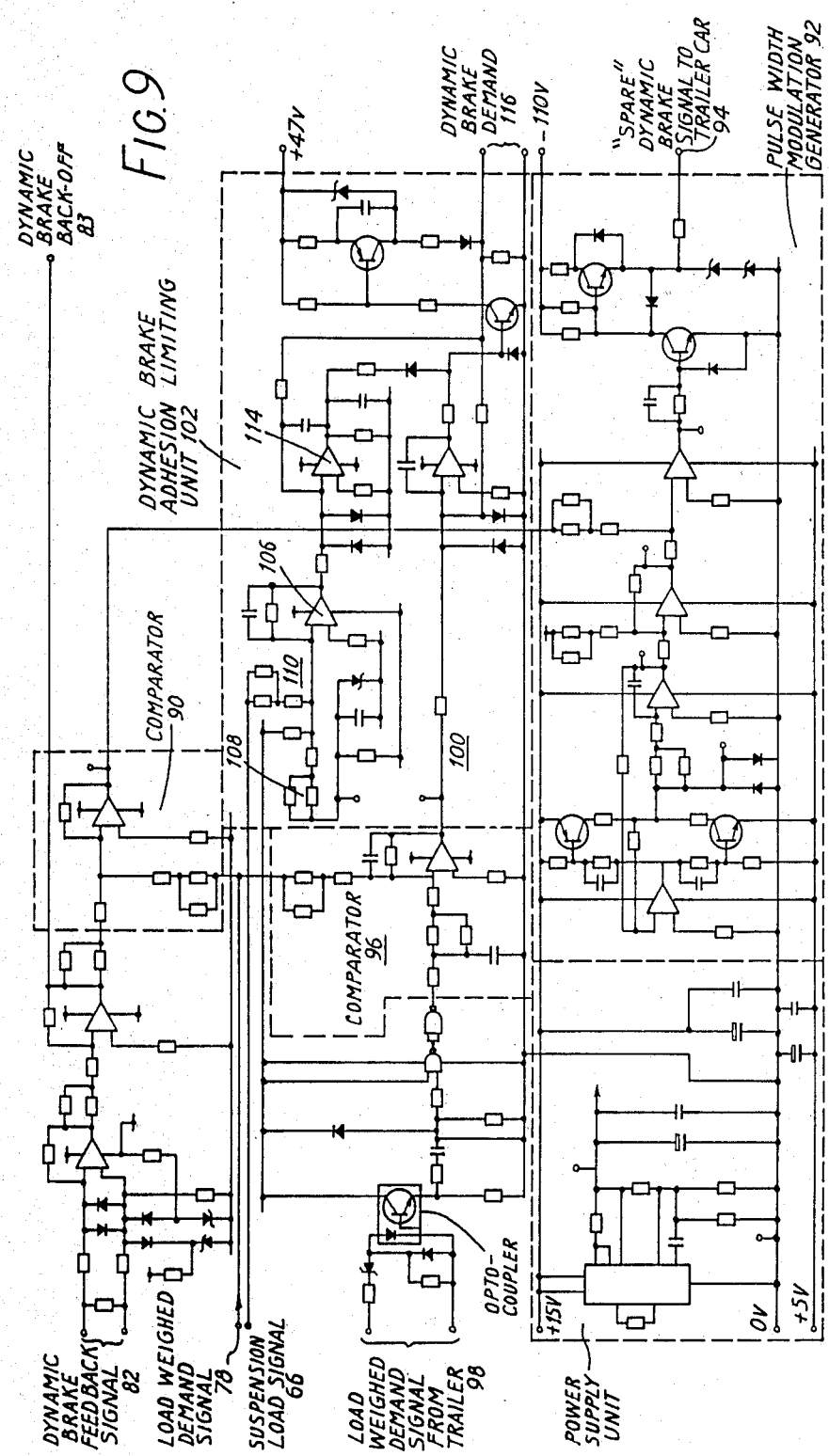

The electronics for each of the motor cars M1 and M2 is shown in the more detailed block diagram of FIG. 5 and in the circuit diagrams of FIGS. 7, 8 and 9, in which like parts have like references. The electronics for the trailer car are shown in the more detailed block diagram of FIG. 6 and in the circuit diagrams of FIGS. 7, 8 and 10, where like parts have like references.

FIG. 7 shows a transducer circuit which is provided on all cars, the transducer 60 comprises an electrical resistance bridge circuit responsive to the load acting on a suspension unit. In an air suspension system this transducer may be responsive to system air pressure. A transducer 16 is energised by the output of a power supply 61 and provides a load influenced voltage connected to the input of an amplifier circuit 62, and through a further inverter amplifier 63 to produce a load signal or suspension pressure signal at terminal 64. This part of the system is not shown in FIGS. 5 and 6, however, the terminal 64 of a transducer circuit is connected to the signal input suspension pressure 66 in FIGS. 5 and 6.

The circuit shown in FIG. 8 is also used on both motor cars and trailer cars, the suspension pressure signal is connected to terminals 66. A pulse width modulated signal representing the driver's brake demand from the encoder 51 (see FIG. 4) is supplied to input terminals 68 through a decoder circuit generally ndicated at 70, which effectively subtracts a fixed percentage (7%) of the pulse width to ensure that a brake application cannot be triggered by a mere transient pulse, also this allows the electronics to provide a good rising edge in accordance with the requirements of subsequent circuits for reliable operation. The brake demand pulse width modulated signal is connected to one input 72 of an electronic multiplier circuit 74, the second input 76 of which is connected to terminal 66 to receive the suspension load signals. The output of multiplier 74 is the so-called load weighed demand signal 78, which is connected to a blending circuit 80, together with further signals 83, a dynamic brake back-off signal, and 84 a dynamic brake fade input. This dynamic brake fade input signal is a digital signal which is normally 0 when the dynamic brake is working effectively but which changes to 1 when the dynamic brake fades as vehicle speed slows.

The blending circuit 80 also receives a step input from inshot circuit 86, in effect a pedestal level generator actuated in response to any level of driver's brake demand signal and which is effective to actuate the brakes sufficiently to take up any slack in the mechanical system, and to bring the friction braking surfaces into rubbing contact. The output of the blending circuit 80 controls, in the example being described, an electro-pneumatic converter, the output terminal 88 is connected to one end of an electro-pneumatic valve energising coil to control current flow from 110 volt supply through the coil; the level of current being proportional to the brake demand and providing downstream of the valve air pressure to actuate the brakes.

Referring now to the remainder of FIG. 5 and FIG. 9 the load weighed driver's brake demand signal 78 is also supplied to a first comparator 90 together with the dynamic brake achieved or feedback signal from input 82 which is also used to produce the dynamic brake back-off signal 83 referred to in connection with FIG. 8. The comparator 90 derives the difference between the demand signal and the achieved signal and supplies the results to the input of a pulse width modulation generator 92, the output 94 of which represents the spare dynamic brake capacity available and is connected, as shown in FIG. 4, to the trailer car.

The load weighed signal 78 is also connected to one input of a second comparator 96, the second input of which is connected to input 98 and receives the trailer dynamic brake demand signal. This comparator 96 effectively sums these signals to produce a demand signal input 100 to an adhesion limit circuit 102. A further input to this circuit is provided by the suspension load signal for the respective car.

As prevously described, the adhesion limit is set according to the calculated maximum brake force that can be sustained for the given load of the vehicle. Therefore there is a minimum retarding force determined in accordance with the tare weight of the vehicle and a progressively increasing retarding force dependent upon the load carried by the vehicle, which relationship has a calculable slope. In the circuit 102 there is provided an amplifier 106 having a first input connected to a first potentiometer chain 108, operative to provide an offset voltage in accordance with a minimum dynamic brake retarding force, and the load signal is connected through a second potentiometer chain 110 which determines the slope of a linear relationship between vehicle weight, as represented by the load signal and braking force, as represented by the brake demand output.

The result of the adhesion limit calculation at the output of amplifier 106 is compared by a comparator 114 with the resultant total brake demand on line 100, and the result, up to the maximum level permitted, is supplied at terminals 116 to the dynamic brake control circuit as a dynamic brake demand. In the present example this signal is a voltage level within the range 0 to 10 volts.

Referring now to the trailer car electronics illustrated by FIGS. 6, 7, 8 and 10; the suspension transducer circuit is as previously described with reference to FIG. 7. The load multiplier circuit 76 is connected to the suspension load input 66 and the driver's brake demand input 68, the inshot circuit 86, blending circuit 80 and electro-pneumatic converter output 88 are also as previously described in FIG. 8.

Figure 10:
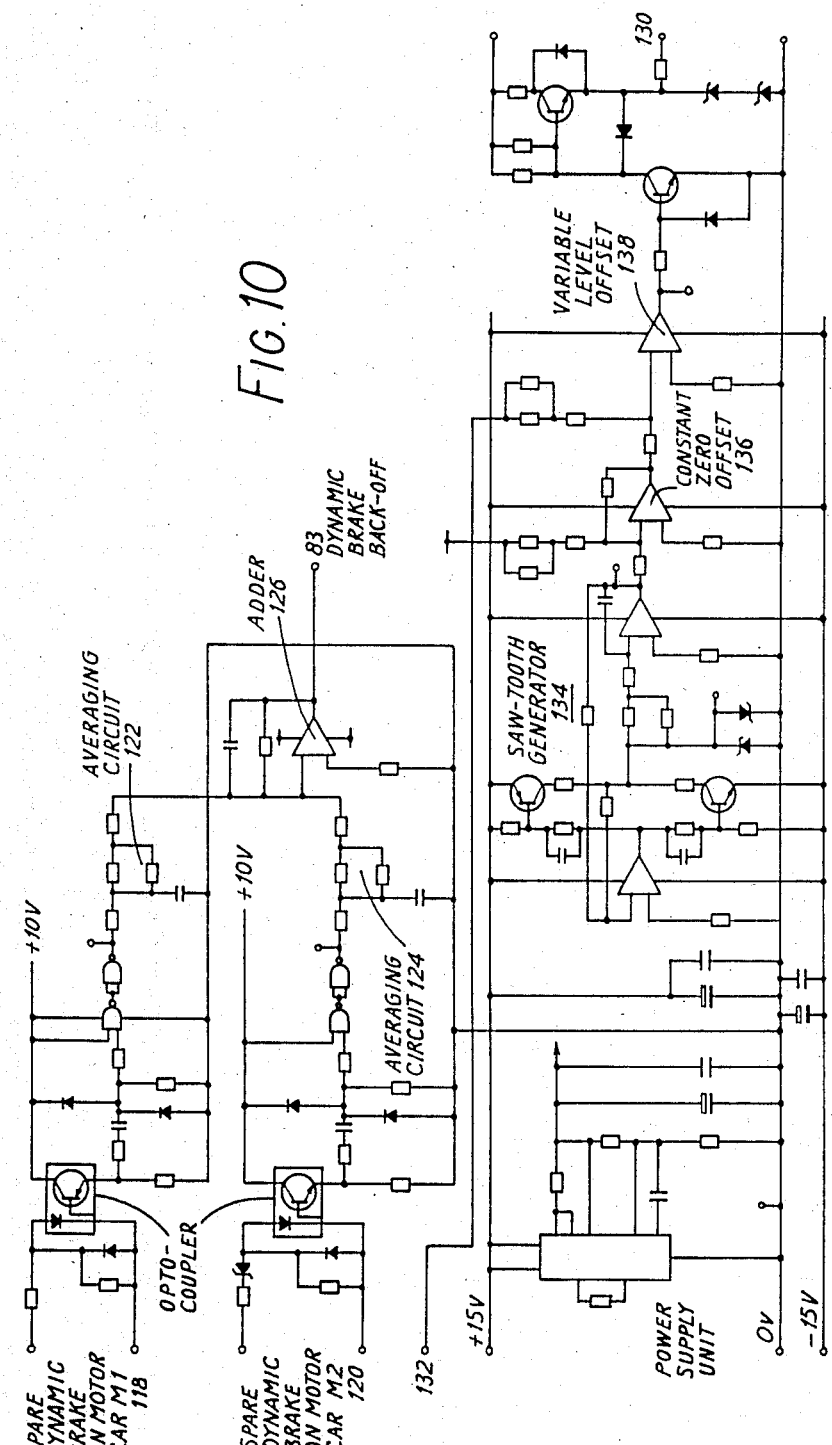

Referring to FIG. 10 the circuit, which is provided only on a trailer car, has a first input 118 connected to receive the spare dynamic brake available signal at terminal 94 of the electronics of the motor car M1, and the similar second input 120 connected to the spare dynamic brake available signal at terminal 94 of the electronics on motor car M2. These two inputs are passed through averaging circuits 122, 124 respectively before being summed in an adder 126, the output of which provides the dynamic brake back-off signal, which is connected to the input 83, FIG. 8 into the blending unit 80 to back-off the electro-pneumatic brake actuating signal according to the amount of braking effort supplied by the dynamic brake. The electronics of the trailer car in FIG. 10 also includes a circuit to generate the trailer's dynamic brake demand as an output 130 supplied to terminal 98 (FIG. 9) of both motor cars M1 and M2. This signal is produced using the load weighed demand signal 78 for the trailer, connected from terminal 79, FIG. 8 to terminal 132, FIG. 10. As previously mentioned this a pulse width modulated signal and is produced by a continuously running sawtooth ramp generator 134 feeding a constant offset amplifier circuit 136, and in series therewith a variable level offset amplifier 138 controlled by the modulating signal and the output of which is connected through a high voltage output stage to terminal 132.

In the described embodiment the circuit shown in each of the drawings of FIGS. 7, 8, 9 and 10 is contained on a single printed circuit card, therefore each of the vehicle electronic blocks comprises three such cards, and each is provided with an individual power supply unit as shown in the drawings. All the signals which are communicated between vehicle units are encoded as pulse-width modulated signals on the "sender" card and decoded on the "receiver" card and returned to analogue signal format.

What is claimed is:

1. A brake control system for a multiple unit train, of motor and trailer units, which has a mixed braking system of dynamic and friction brakes in which the dynamic brakes are applied preferentially, said system comprising means for generating a brake demand signal calling for a rate of retardation of the train, load responsive means on each unit operative to provide for a unit, a load weighed brake signal corresponding to the brake demand signal and in accordance with the load of the unit, summing means having inputs connected to receive the load weighed brake signals from all units and an output connected to control actuation of the dynamic brake system, friction brake controlling means on each unit connected to control the level of friction braking of a respective unit in response to the difference between the load weighed brake signal for the unit and a further signal which, on a dynamically braked unit, represents the dynamic braking effort achieved or, on a trailer unit, the excess of dynamic brake effort achieved over that required by the load weighed signals of the dynamically braked units and dynamic brake control signal limiting means operative to effectively limit dynamic braking to a calculated maximum adhesion limit.

2. A brake control system according to claim 1 wherein the limiting means is responsive to an output of the load responsive means of the motor units and the maximum adhesion limit is calculated according to the load of the motor units.

3. A brake control system according to claim 2 wherein the dynamic braking is limited to a level in accordance with the lowest calculated adhesion limit of a motor unit.

4. A brake control system according to claim 2 wherein the dynamic braking of a motor unit is limited to a level in accordance with the calculated adhesion limit for that motor unit.

5. A brake control system according to claim 1 wherein a trailer unit brake demand is shared by the dynamic brakes of the motor units up to the maximum level of dynamic brake effort permitted in accordance with the calculated maximum adhesion.

6. A brake control system according to claim 5 wherein a motor unit includes means for generating a signal representing unused dynamic brake capacity of the motor unit, said means being connected to further means on a trailer unit which is operative to determine the difference between a total unused dynamic brake capacity and a braking requirement in respect of said trailer whereby to determine the level of braking effort required from the friction brakes of the trailer unit.

7. A brake control system according to claim 6 wherein the means for calculating an adhesion limit comprises an amplifier having an input connected to receive a signal representing vehicle load, first circuit means for producing a predetermined offset voltage at said amplifier input, in order to represent a minimum dynamic brake effort, and second circuit means arranged to produce for said amplifier a predetermined gain, whereby to provide a linear relationship between a load signal input and a brake demand output having a predetermined slope.

8. A brake control system according to claim 1 wherein each motor car is provided with a load responsive means, first summing means having inputs connected to receive a first load weighed brake demand signal for that unit and a second signal representing the dynamic brake effort achieved, and operative to provide a signal in accordance with the difference between said inputs to control operation of friction brake means, second summing means having inputs connected to receive the first load weighed signal and the second signal representing dynamic brake effort achieved, and operative to provide a signal in accordance with the difference between said inputs to represent unused dynamic brake capacity, and third summing means having inputs connected to receive the first load weighed signal and a further signal representing trailer brake demand and operative to produce a signal in accordance with the sum of said inputs to represent a dynamic brake demand which is connected through a further circuit means responsive to a signal from the load responsive means to limit said dynamic brake demand signal to a maximum level dependent upon said load signal, and wherein a trailer car is provided with a load responsive means, first means for summing the signals from each motor car representing achieved dynamic brake effort to provide a total signal therefor, and second means for comparing a load weighed brake demand signal for the trailer and total dynamic brake effort signal to provide a signal to actuate the trailer friction brakes when the first signal is greater than the second of said signals.

9. A brake control system according to claim 8 wherein the first summing means includes a further input connected to receive a digital signal arranged to change state and thereby actuate the friction brakes when the dynamic brake effort achieved falls below a predetermined level.

10. A brake control system according to claim 8 wherein there is provided an inshot circuit in parallel with the means for producing the load weighed signal and connected to a further input of said first summing means, said inshot circuit being arranged to provide sufficient output to the friction brake means to produce rubbing contact.

11. A brake control system according to claim 1 wherein there is provided means for communicating signals between a motor car and a trailer car including on the one a pulse width modulation signal encoder and on the other a pulse width modulation decoder.

* * * * *